(12) United States Patent
Mater, Jr. et al.

(10) Patent No.: US 12,187,092 B2
(45) Date of Patent: Jan. 7, 2025

(54) TANDEM AXLE SUSPENSION SYSTEM WITH KEEPER HAVING SLIDING SLIPPER BLOCKS

(71) Applicant: RV Ride Control, LLC, Maricopa, AZ (US)

(72) Inventors: Robert F. Mater, Jr., Newnan, GA (US); Audreg R. Dismuke, Maricopa, AZ (US)

(73) Assignee: RV Ride Control, LLC, Maricopa, AZ (US)

( * ) Notice: Subject to any disclaimer, the term of this patent is extended or adjusted under 35 U.S.C. 154(b) by 0 days.

(21) Appl. No.: 18/232,915

(22) Filed: Aug. 11, 2023

(65) Prior Publication Data
US 2024/0051363 A1 Feb. 15, 2024

Related U.S. Application Data

(60) Provisional application No. 63/397,089, filed on Aug. 11, 2022.

(51) Int. Cl.
*B60G 5/00* (2006.01)
*B60G 11/02* (2006.01)
*B60G 15/02* (2006.01)

(52) U.S. Cl.
CPC ............. *B60G 5/00* (2013.01); *B60G 11/02* (2013.01); *B60G 15/02* (2013.01)

(58) Field of Classification Search
CPC . B60G 5/00; B60G 5/005; B60G 5/04; B60G 5/047; B60G 11/02; B60G 11/04; B60G 11/107; B60G 2202/112; B60G 2204/121; B60G 15/02
See application file for complete search history.

(56) References Cited

U.S. PATENT DOCUMENTS

| 2,760,784 | A | | 8/1956 | Talbert et al. |
| 2,900,197 | A | * | 8/1959 | Hutchens ............... B60G 5/047 |
| | | | | 267/66 |
| 2,997,114 | A | | 8/1961 | Hines |
| 3,175,706 | A | | 3/1965 | Mathers et al. |

(Continued)

FOREIGN PATENT DOCUMENTS

| GB | 1110602 | 4/1968 |
| GB | 1532316 | 11/1978 |

OTHER PUBLICATIONS

Written Opinion and International Search Report for PCT/US17/41673, dated Oct. 31, 2017.

(Continued)

*Primary Examiner* — Laura Freedman
(74) *Attorney, Agent, or Firm* — Warren D. Schickli; Stites & Harbison PLLC (57) ABSTRACT

A tandem axle suspension system includes a first leaf spring having a first eye end and a second eye end, a second leaf spring having a third eye end and a fourth eye end and an assembly for converting double eye leaf springs of a tandem axle suspension system into slipper springs. That assembly includes a keeper including a first guide track and a second guide track, a first follower adapted for receipt of the first eye end and sliding movement along the first guide track and a second follower adapted for receipt of the third eye end and sliding movement along the second guide track.

18 Claims, 9 Drawing Sheets

(56) References Cited

U.S. PATENT DOCUMENTS

| | | | |
|---|---|---|---|
| 3,195,917 A | 7/1965 | William | |
| 3,471,165 A | 10/1969 | Raidel | |
| 3,499,660 A * | 3/1970 | Raidel | B60G 5/047 |
| | | | 280/682 |
| 3,510,149 A | 5/1970 | Raidel | |
| 3,554,596 A | 1/1971 | Le Fevre | |
| 3,586,308 A | 6/1971 | King | |
| 3,591,197 A | 7/1971 | Haley | |
| 3,730,548 A | 5/1973 | Thaxton | |
| 3,730,550 A | 5/1973 | Thaxton | |
| 3,738,631 A | 6/1973 | Haley | |
| 3,799,562 A | 3/1974 | Hinchliff | |
| 3,841,652 A | 10/1974 | Higginson | |
| 3,844,579 A | 10/1974 | Cunha | |
| 3,982,446 A | 9/1976 | Van Dyken | |
| 4,033,606 A | 7/1977 | Ward et al. | |
| 4,065,153 A | 12/1977 | Pringle | |
| 4,267,896 A | 5/1981 | Hendriksen | |
| 4,334,697 A | 6/1982 | Deweese | |
| 4,383,703 A | 5/1983 | Honda et al. | |
| 4,397,478 A | 8/1983 | Jensen et al. | |
| 4,412,690 A | 11/1983 | Prokop et al. | |
| 4,417,426 A | 11/1983 | Meng | |
| 4,502,707 A | 3/1985 | Jable et al. | |
| 4,505,010 A | 3/1985 | Arenhold | |
| 4,586,359 A | 5/1986 | Parks | |
| 4,718,691 A | 1/1988 | Specktor et al. | |
| 4,846,495 A | 7/1989 | Laidely | |
| 4,869,527 A | 9/1989 | Coddens | |
| 4,872,653 A | 10/1989 | Chuchua | |
| 4,919,404 A | 4/1990 | Santini | |
| 4,998,749 A | 3/1991 | Bockewitz | |
| 5,002,305 A | 3/1991 | Raidel | |
| 5,007,660 A | 4/1991 | Orndorff, Jr. et al. | |
| 5,016,906 A | 5/1991 | Cadden | |
| 5,037,126 A | 8/1991 | Gottschalk et al. | |
| 5,052,711 A | 10/1991 | Pirkey et al. | |
| 5,074,161 A | 12/1991 | Hancock | |
| 5,209,518 A | 5/1993 | Heckenliable et al. | |
| 5,219,151 A * | 6/1993 | Stewart | B60G 11/107 |
| | | | 267/262 |
| 5,255,611 A | 10/1993 | Schneider | |
| 5,271,638 A | 12/1993 | Yale | |
| 5,293,948 A | 3/1994 | Crabb | |
| 5,301,480 A | 4/1994 | Oyama et al. | |
| 5,301,977 A | 4/1994 | Schlosser et al. | |
| 5,403,032 A | 4/1995 | Hellwig | |
| 5,526,895 A * | 6/1996 | Shin | B62D 7/04 |
| | | | 280/81.6 |
| 5,542,511 A | 8/1996 | Steiner et al. | |
| 5,599,038 A | 2/1997 | German | |
| 5,617,072 A | 4/1997 | McNeal | |
| 5,634,605 A | 6/1997 | Rubel et al. | |
| 5,647,606 A | 7/1997 | Jordan | |
| 5,662,314 A | 9/1997 | Stoltzfus | |
| 5,683,098 A | 11/1997 | Vandenberg | |
| 5,873,581 A | 2/1999 | Yale | |
| 6,027,129 A | 2/2000 | Kleinschmit et al. | |
| D422,253 S | 4/2000 | Boykin | |
| 6,082,750 A | 7/2000 | Merkler et al. | |
| 6,139,092 A | 10/2000 | Doner et al. | |
| 6,158,761 A | 12/2000 | King | |
| 6,220,580 B1 | 4/2001 | Balczun | |
| 6,264,231 B1 | 7/2001 | Scully | |
| 6,272,898 B1 | 8/2001 | Soyk | |
| 6,386,565 B1 | 5/2002 | Kugler | |
| 6,409,189 B1 | 6/2002 | Orimoto et al. | |
| 6,434,907 B2 | 8/2002 | Simboli | |
| 6,478,321 B1 | 11/2002 | Heitzmann | |
| 6,527,287 B2 | 3/2003 | Hedenberg | |
| 6,659,479 B1 | 12/2003 | Raidel, II et al. | |
| 6,679,517 B2 * | 1/2004 | Proia | B60G 11/10 |
| | | | 280/682 |
| 6,682,280 B1 | 1/2004 | Lindsay | |
| 6,698,775 B2 | 3/2004 | Ness | |
| 6,709,014 B2 | 3/2004 | Svartz et al. | |
| 6,764,087 B2 | 7/2004 | Assaf et al. | |
| D494,894 S | 8/2004 | Carlson | |
| 6,966,612 B2 | 11/2005 | Philpott | |
| 7,093,882 B2 | 8/2006 | Lake | |
| 7,100,933 B2 | 9/2006 | Zackovich et al. | |
| 7,213,825 B2 | 5/2007 | Hitt et al. | |
| 7,249,780 B1 * | 7/2007 | Wilson | B60G 5/00 |
| | | | 267/262 |
| 7,296,809 B2 | 11/2007 | Zebolsky | |
| 7,296,821 B2 | 11/2007 | Fenton | |
| 7,331,588 B2 | 2/2008 | Johnson | |
| 7,415,771 B2 | 8/2008 | Harrill | |
| 7,467,473 B2 | 12/2008 | Harrill et al. | |
| 7,481,407 B2 | 1/2009 | Kim et al. | |
| 7,513,517 B2 | 4/2009 | Barton et al. | |
| 7,537,226 B1 | 5/2009 | Collazo | |
| 7,611,107 B2 | 11/2009 | Howell | |
| 7,651,107 B1 | 1/2010 | Chapin et al. | |
| 7,669,867 B2 | 3/2010 | Kuraishi | |
| 7,673,891 B2 | 3/2010 | Johns | |
| 7,850,195 B2 | 12/2010 | Simard et al. | |
| 7,891,679 B2 | 2/2011 | Svartz et al. | |
| 7,905,056 B2 | 3/2011 | Kornfield | |
| 7,950,678 B1 | 5/2011 | Bauder | |
| 8,376,380 B2 | 2/2013 | Smith | |
| 8,511,929 B2 | 8/2013 | Raye et al. | |
| 8,567,772 B2 | 10/2013 | McCarthy et al. | |
| 8,590,912 B2 | 11/2013 | McCarthy et al. | |
| 8,708,353 B1 | 4/2014 | Vey | |
| 8,733,768 B1 | 5/2014 | Shoulders | |
| 8,764,036 B2 | 7/2014 | Muckelrath et al. | |
| 8,944,447 B2 | 2/2015 | Khoury | |
| 8,979,105 B2 | 3/2015 | McCarthy et al. | |
| 8,998,160 B1 | 4/2015 | Vanwey et al. | |
| 9,333,827 B2 | 5/2016 | Mater, Jr. et al. | |
| 9,452,640 B2 | 9/2016 | Mater, Jr. | |
| 9,555,844 B2 | 1/2017 | Hicks | |
| 9,677,585 B2 | 6/2017 | Broussard et al. | |
| 10,100,861 B2 | 10/2018 | Zhang | |
| 10,370,033 B1 | 8/2019 | Klein | |
| 11,364,760 B2 | 6/2022 | Mater, Jr. et al. | |
| 11,407,270 B2 | 8/2022 | Mater, Jr. et al. | |
| 2003/0132593 A1 | 7/2003 | Ross et al. | |
| 2005/0023790 A1 | 2/2005 | Galazin | |
| 2005/0093286 A1 | 5/2005 | Oh | |
| 2005/0156398 A1 | 7/2005 | Ramsey | |
| 2005/0173892 A1 | 8/2005 | Terminello | |
| 2006/0249923 A1 | 11/2006 | Ramsey | |
| 2007/0052195 A1 | 3/2007 | Collazo | |
| 2007/0145656 A1 | 6/2007 | Svendsen et al. | |
| 2010/0219677 A1 | 9/2010 | Borgi | |
| 2011/0068524 A1 | 3/2011 | McCarthy et al. | |
| 2011/0095501 A1 | 4/2011 | Piehl et al. | |
| 2011/0175313 A1 | 7/2011 | Pierce et al. | |
| 2012/0153589 A1 | 6/2012 | McCarthy et al. | |
| 2014/0117639 A1 | 5/2014 | Ramsey | |
| 2020/0031189 A1 * | 1/2020 | Prikkel, III | B60G 11/04 |

OTHER PUBLICATIONS

Preliminary Report on Patentability for PCT/US17/41673, dated Jan. 14, 2019.

\* cited by examiner

TANDEM AXLE SUSPENSION SYSTEM WITH KEEPER HAVING SLIDING SLIPPER BLOCKS

RELATED APPLICATIONS

This application claims priority to U.S. Provisional Patent Application Ser. No. 63/397,089 filed on Aug. 11, 2022, the full disclosure of which is hereby incorporated by reference.

TECHNICAL FIELD

This document relates generally to the trailer equipment field and, more particularly, to a new and improved tandem axle suspension system, an assembly for converting double eye leaf springs of a tandem axle suspension system to function as slipper springs and a related method of converting a leaf spring to function as a slipper spring.

BACKGROUND

This document relates to a new and improved tandem axle suspension system that provides a number of benefits and advantages. The tandem axle suspension system is easy to install. Installation does not require any drilling or welding. Significantly, when properly installed, the system advantageously allows stock double eye leaf springs to function as slipper springs to effectively achieve independent axle operation. The system allows the double eye leaf springs to defuse spring rebound by slipping in and out to give a no rebound ride. The system also replaces the equalizer which under certain panic braking conditions may cause a rearward rotation of the front rear axle which in turn forces the state of the art equalizer to rotate rearward to a degree that causes partial lifting of the rearward rear axle tires from the pavement, thereby reducing braking traction with the road surface. Thus, better braking performance is achieved.

SUMMARY

In accordance with the purposes and benefits set forth herein, a new and improved tandem axle suspension system is provided. That tandem axle suspension system comprises, consists of or consists essentially of: (a) a first leaf spring having a first eye end and a second eye end, (b) a second leaf spring having a third eye end and a fourth eye end, (c) a keeper including a first guide track and a second guide track, (d) a first follower adapted for receipt of the first eye end and sliding movement along the first guide track, and (e) a second follower adapted for receipt of the third eye end and sliding movement along the second guide track.

In at least one of the many possible embodiments of the tandem axle suspension system, the keeper includes a center section, a first sidewall depending from the center section and a second sidewall depending from the center section wherein the center section and the first and second sidewalls define a channel. The first guide track may include a first elongated slot formed in the first sidewall and a second elongated slot formed in the second sidewall. The second guide track may include a third elongated slot formed in the first sidewall and a fourth elongated slot formed in the second sidewall.

In at least one embodiment of the tandem axle suspension system, (a) the first elongated slot is transversely aligned with the second elongated slot, (b) the third elongated slot is transversely aligned with the fourth elongated slot, (c) the first elongated slot is longitudinally aligned with the third elongated slot and (d) the second elongated slot is longitudinally aligned with the fourth elongated slot.

In some embodiments of the tandem axle suspension system, the system further includes a first pin adapted to secure the first eye end of the first leaf spring to the first follower and a second pin adapted to secure the third eye end of the second leaf spring to the second follower. The first follower may include a first slipper block received for sliding movement along the first elongated slot and a second slipper block received for sliding movement along the second elongated slot.

In some embodiments, (a) the first slipper block includes a first pin receiver, (b) the second slipper block includes a second pin receiver, (c) the first pin is received in and extends through the first and second pin receivers transversely across the channel and (d) the first eye end is captured on the first pin between the first and second slipper blocks.

The second follower may include a third slipper block received for sliding movement along the third elongated slot and a fourth slipper block received for sliding movement along the fourth elongated slot. Still further, in some embodiments, (a) the third slipper block includes a third pin receiver, (b) the fourth slipper block includes a fourth pin receiver, (c) the second pin is received in and extends through the third and fourth pin receivers transversely across the channel and (d) the third eye end is captured on the second pin between the third and fourth slipper blocks.

The first pin and the second pin may both include a head end and a threaded end adapted to receive a lock nut. Still further, the tandem axle suspension system may include a first twist plate and a second twist plate carried on and projecting from the first sidewall adjacent the center section. The tandem axle suspension system may include a plurality of shock mount receivers provided in at least one of the first sidewall and the second sidewall.

In accordance with yet another aspect, a new and improved assembly is provided for converting double eye leaf springs of a tandem axle suspension system to function as slipper springs. That assembly comprises, consists essentially of or consists of: (a) a keeper including a first guide track and a second guide track, (b) a first follower adapted for receipt of one eye end of a first leaf spring and sliding movement along the first guide track and (c) a second follower adapted for receipt of an eye end of a second leaf spring and sliding movement along the second guide track.

The keeper may include a center section, a first sidewall depending from the center section and a second sidewall depending from the center section wherein the center section and the first and second sidewalls define a channel. The first guide track may include a first elongated slot formed in the first sidewall and a second elongated slot formed in the second sidewall and the second guide track may include a third elongated slot formed in the first sidewall and a fourth elongated slot formed in the second sidewall.

In at least some embodiments of the assembly, (a) the first elongated slot is transversely aligned with the second elongated slot, (b) the third elongated slot is transversely aligned with the fourth elongated slot, (c) the first elongated slot is longitudinally aligned with the third elongated slot and (d) the second elongated slot is longitudinally aligned with the fourth elongated slot.

At least some embodiments of the assembly further include a first pin adapted to secure the first end of the first leaf spring to the first follower and a second pin adapted to secure the third end of the second leaf spring to the second follower and wherein:

(1) the first follower includes a first slipper block received for sliding movement along the first elongated slot and a second slipper block received for sliding movement along the second elongated slot, (2) (a) the first slipper block includes a first pin receiver, (b) the second slipper block includes a second pin receiver, (c) the first pin is received in and extends through the first and second pin receivers transversely across the channel and (d) the first eye end is captured on the first pin between the first and second slipper blocks, (3) the second follower includes a third slipper block received for sliding movement along the third elongated slot and a fourth slipper block received for sliding movement along the fourth elongated slot, and (4) (a) the third slipper block includes a third pin receiver, (b) the fourth slipper block includes a fourth pin receiver, (c) the second pin is received in and extends through the third and fourth pin receivers transversely across the channel and (d) the third eye end is captured on the second pin between the third and fourth slipper blocks.

In accordance with yet another aspect, a related method of converting a leaf spring to function as a slipper spring is provided. That method comprises, consists of or consists essentially of connecting an eyelet at one end of the leaf spring to a slipper block adapted for sliding movement along a guide track of a keeper fixed to a support frame. The method may further include the step of providing for limited sliding movement of the slipper block along the guide track in a direction parallel to a longitudinal axis of the leaf spring.

In the following description, there are shown and described several different embodiments of the new and improved tandem axle suspension system, the assembly for converting double eye leaf springs of a tandem axle suspension system to function as slipper springs and the related method of converting a leaf spring to function as a slipper spring. As it should be realized, the system, assembly and related method are capable of other, different embodiments and their several details are capable of modification in various, obvious aspects all without departing from the system, assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein by reference and forming a part of the specification, illustrate several aspects of the new and improved tandem axle suspension system, the assembly for converting double eye leaf springs of a tandem axle suspension system to function as slipper springs and the related method of converting a leaf spring to function as a slipper spring and together with the description serve to explain certain principles thereof.

Reference will now be made in detail to the present preferred embodiments of the tandem axle suspension system, the assembly for converting double eye leaf springs of a tandem axle suspension system to function as slipper springs and the related method of converting a leaf spring to function as a slipper spring.

DETAILED DESCRIPTION

Figure 1A:
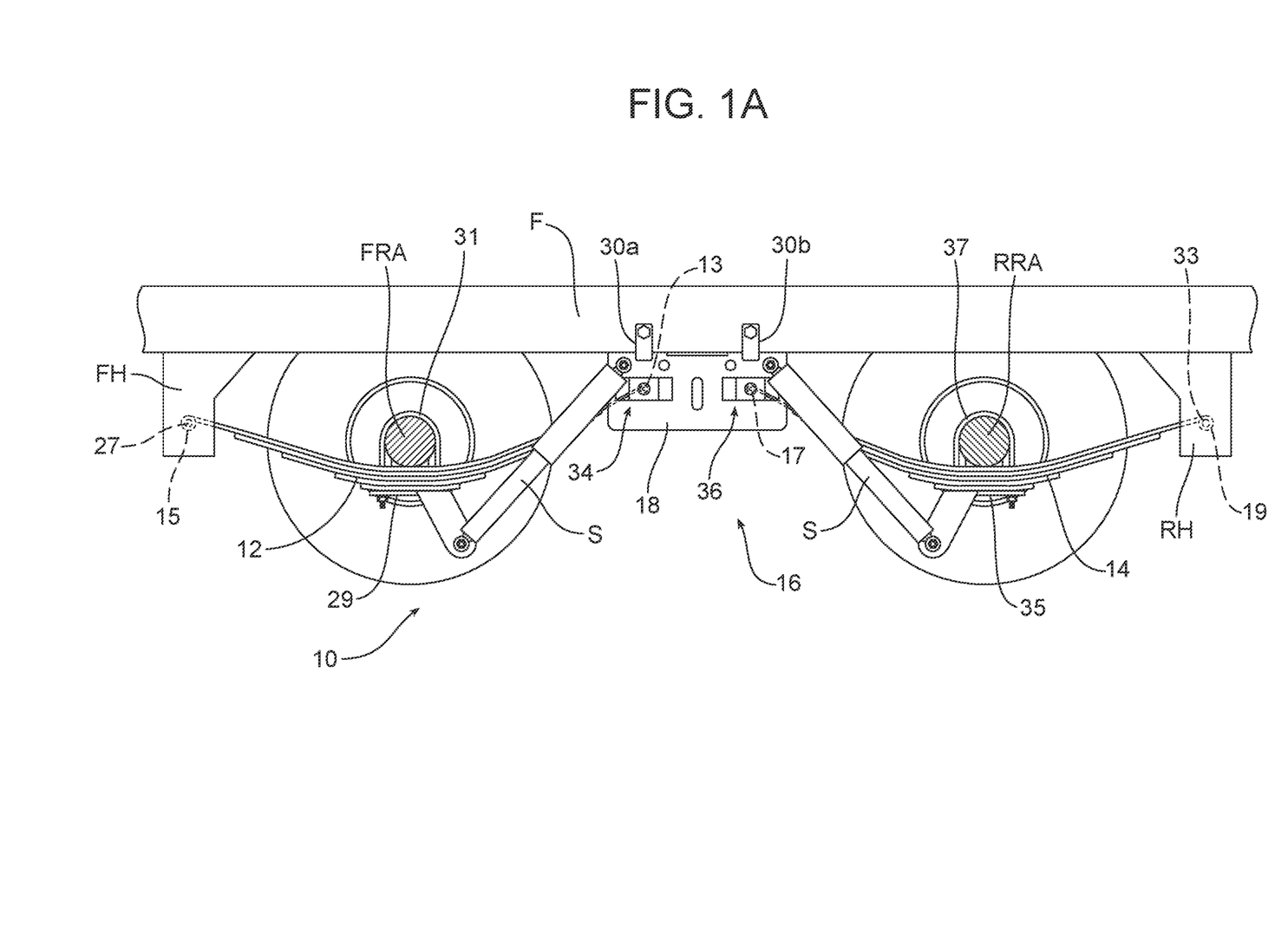
FIG. 1A is a schematic side elevational view of the complete tandem axle suspension system for one side of a tandem axle trailer.
Figure 1B:
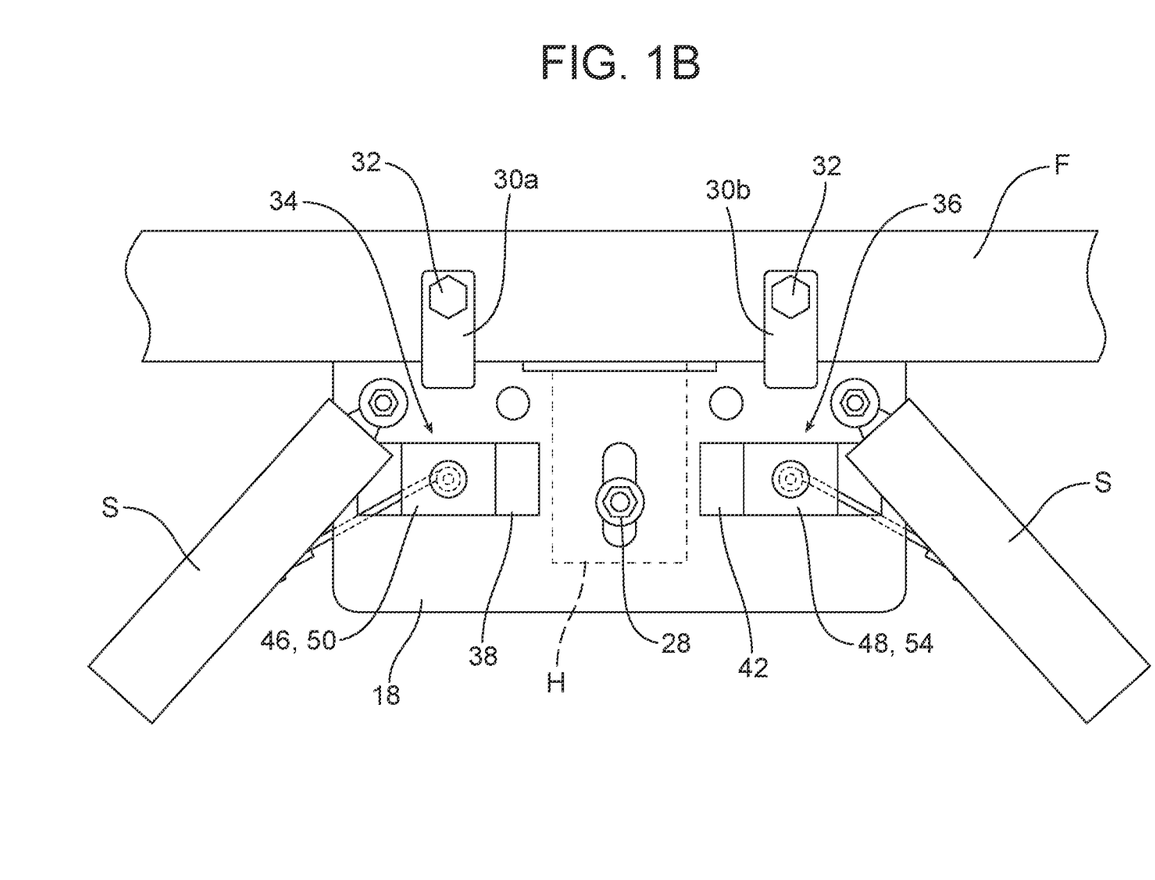
FIG. 1B is a detailed side elevational view of the complete tandem axle suspension system shown in FIG. 1A.
Figure 2A:
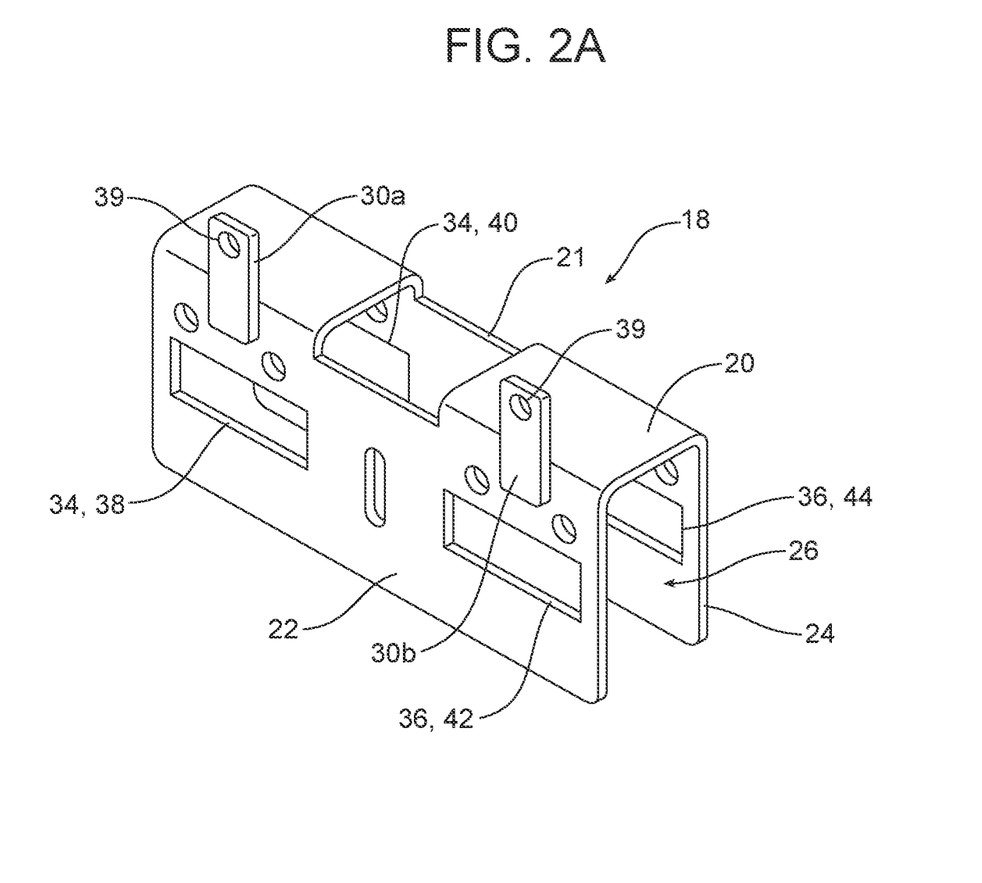
FIGS. 2A-2D are respective detailed perspective, right side elevational, left side elevational and bottom plan views of the keeper component of the tandem axle suspension system.
Figure 2B:
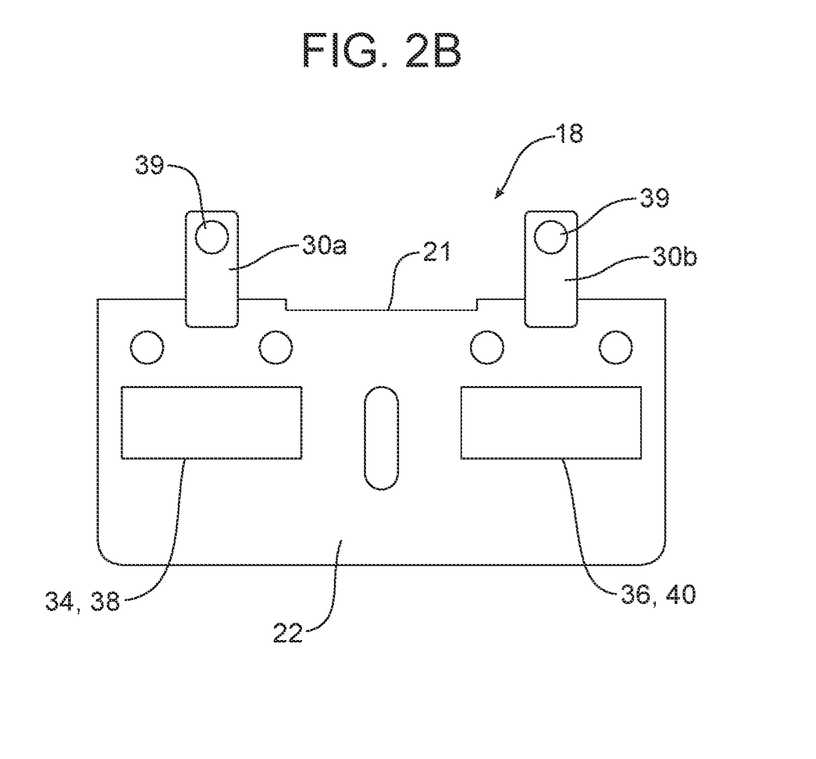
Figure 2C:
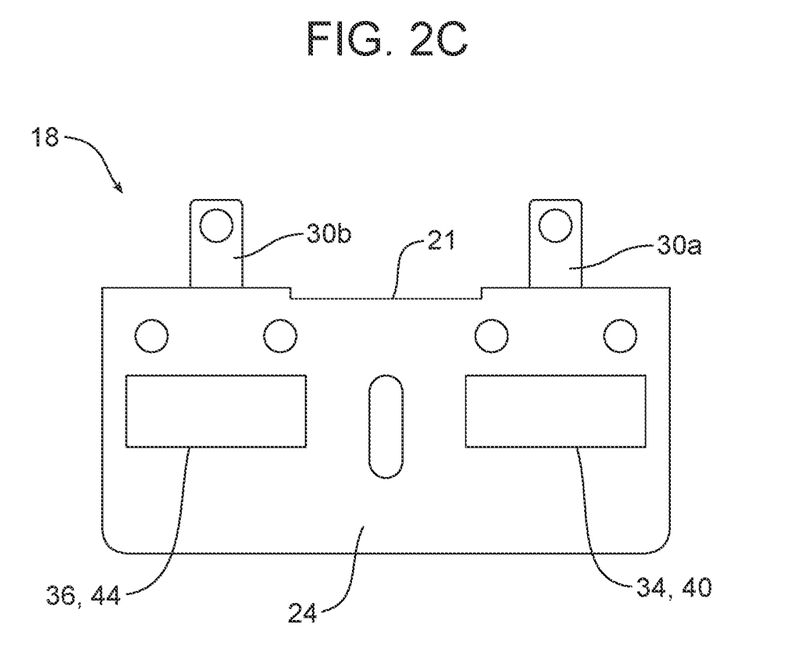
Figure 2D:
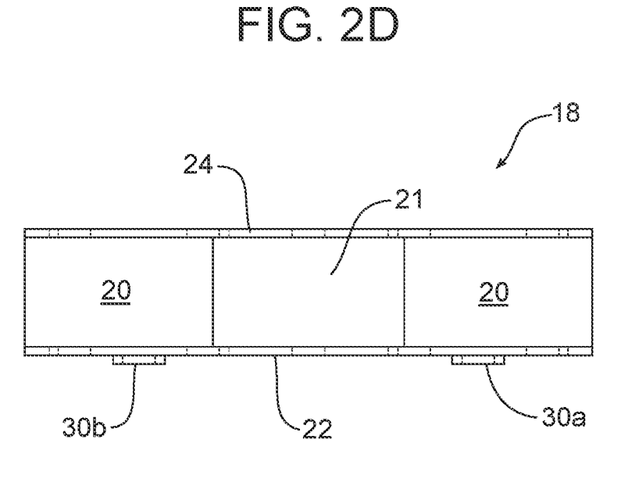

Reference is now made to FIGS. 1A and 1B which are side elevational illustrations of the new and improved tandem axle suspension system 10 which includes (a) a first leaf spring 12, having a first eye end 13 and a second eye end 15, (b) a second left spring 14, having a third eye end 17 and a fourth eye end 19, and (c) an assembly, generally designated by reference numeral 16, that is adapted for converting double eye leaf springs 12, 14 of a tandem axle suspension to function as slipper springs.

In operation, the first leaf spring 12 and the second leaf spring 14 are provided in series with the first eye end 13 and the third eye end 17 oriented toward each other and held by the keeper 18, which is described in detail below. Thus, the two springs 12, 14 are oriented so that the longitudinal axis of the first leaf spring 12 is aligned with the longitudinal axis of the second leaf spring 14. The second eye end 15 of the first leaf spring 12 is fixed to the front hanger FH depending from the trailer frame F by means of the mounting bolt 27. A tie plate 29 and cooperating U-bolt 31 secure the first leaf spring 12 to the forward rear axle FRA. The fourth eye end 19 of the second leaf spring 14 is fixed to the rear hanger RH depending from the trailer frame F by means of the mounting bolt 33. A tie-plate 35 and a cooperating U-bolt 37 secure the second leaf spring 14 to the rearward rear axle RRA.

As best shown in FIGS. 2A-2D, the assembly 16 includes the keeper 18 having a housing that is substantially U-shaped in cross section. The keeper 18 is open at the bottom and the front and rear ends. The keeper 16 includes a center section 20, a first sidewall 22 and a second sidewall 24. The center section 20 includes a receiver 21 in the form of a cut out adapted to receive a center hanger H carried by and depending from the I-beam trailer frame F.

Figure 5:
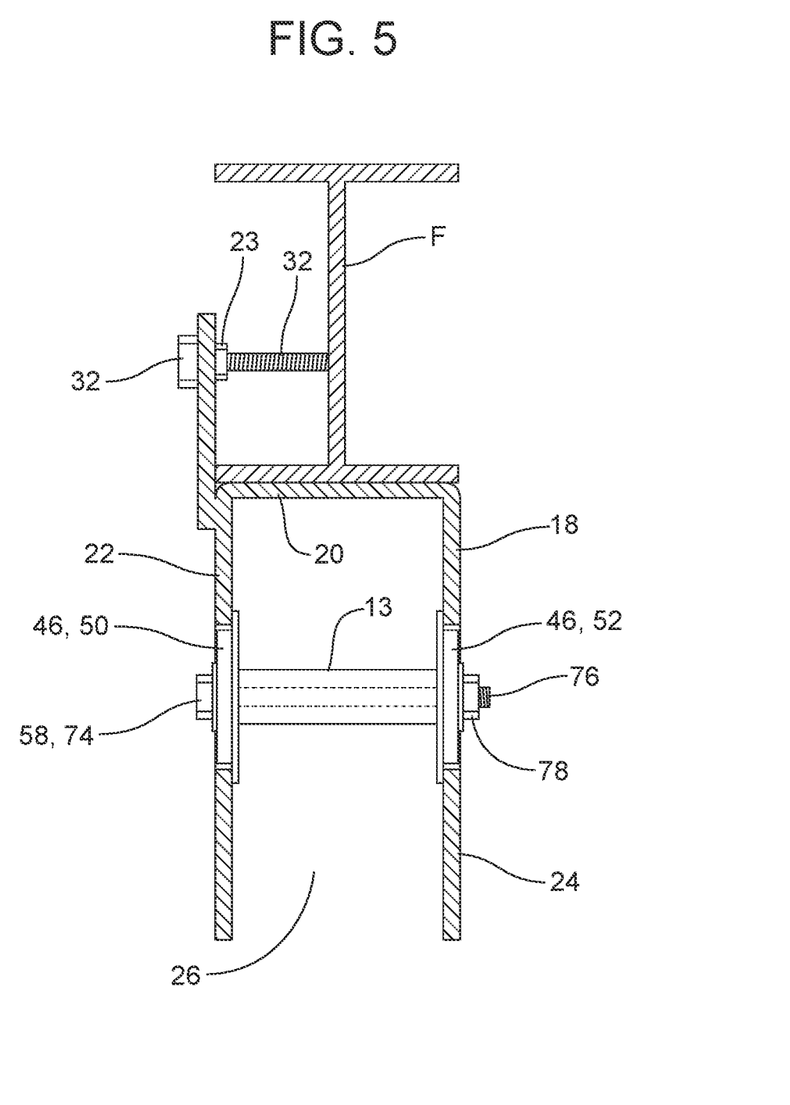
FIG. 5 is a detailed, transverse cross sectional view showing how the slipper blocks engage in the guide tracks of the keeper and how the eye ends of the leaf springs are connected to and captured between the slipper blocks.

The two sidewalls 22, 24 depend from opposite sides of the center section 20. Together, the center section 20 and the sidewalls 22, 24 define a channel 26 that, as noted above, is open at each end. A mounting bolt 28 secures the keeper 16 to the center hanger H. First and second anti-twist plates 30a, 30b are carried on the first sidewall 22 and project above the center section 20. Bolts 32 are pushed through the apertures 39 in the anti-twist plates 30a, 30b until the distal ends thereof abut the I-beam trailer frame F. Jam nuts 23 are then tightened on the bolts 32 against the back side of the anti-twist plates 30a, 30b as shown in FIG. 5 to hold the distal ends of the bolts 32 against the frame F so as to resist twisting of the keeper 18 relative to the frame.

Figure 4:
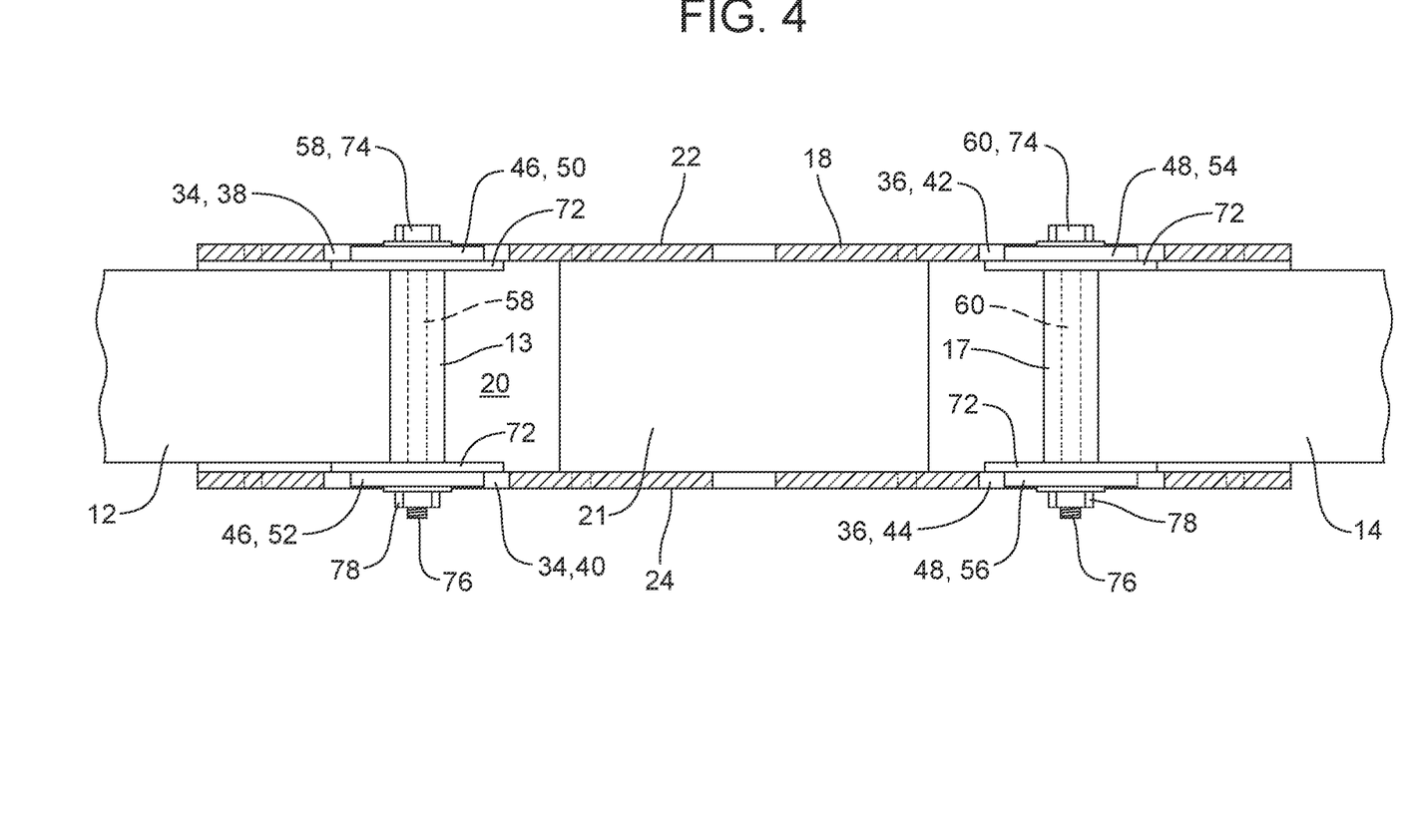
FIG. 4 is a detailed, longitudinal cross sectional view showing how the slipper blocks engage in the guide tracks of the keeper and how the eye ends of the leaf springs are connected to and captured between the slipper blocks.

As shown in the drawing figures, including particularly FIG. 4, the keeper 18 also includes a first guide track, generally designated by reference numeral 34, and a second guide track, generally designated by reference numeral 36. More specifically, the first guide track 34 includes a first elongated slot 38 formed in the first sidewall 22 and a second elongated slot 40 formed in the second sidewall 24. Similarly, the second guide 36 track includes a third elongated slot 42 formed in the first sidewall 22 and a fourth elongated slot 44 formed in the second sidewall 24. As clearly shown in the drawing figures, (a) the first elongated slot 38 is transversely aligned with the second elongated slot 40, (b) the third elongated slot 42 is transversely aligned with the fourth elongated slot 44, (c) the first elongated slot is longitudinally aligned with the third elongated slot and (d) the second elongated slot is longitudinally aligned with the fourth elongated slot.

The assembly 16 also includes a first follower 46 adapted for the receipt of the first eye end 13 of the first leaf spring 12. Still further, the assembly 16 also includes a second follower 48 adapted for the receipt of the third eye end 17 of the second leaf spring 14. More specifically, the first follower 46 comprises a first slipper block 50 that is received for sliding movement along the first elongated slot 38 and a second slipper block 52 that is received for sliding movement along the second elongated slot 40. Similarly, the second follower 48 comprises a third slipper block 54 that is received for sliding movement along the third elongated slot 42 and a fourth slipper block 56 that is received for sliding movement along the fourth elongated slot 44.

Figure 3A:
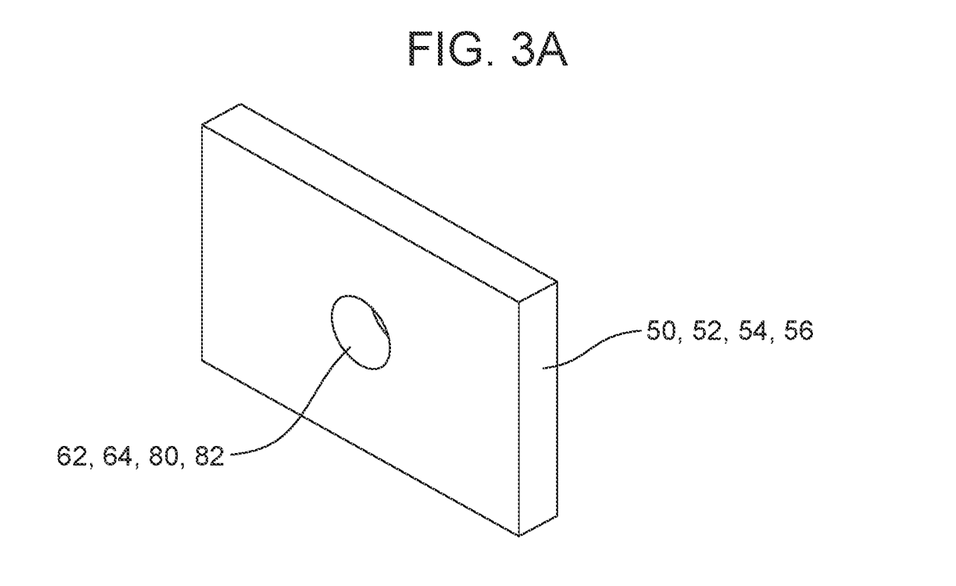
FIGS. 3A and 3B are respective detailed perspective and end views of one of the followers/slipper blocks of the tandem axle suspension system.
Figure 3B:
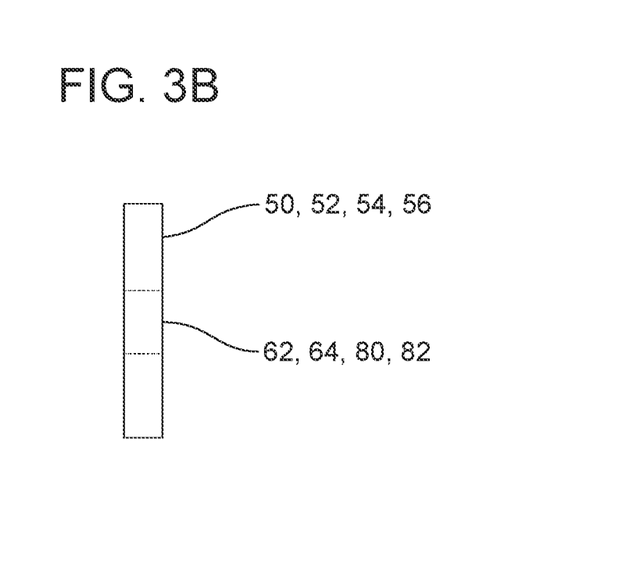

A first pin 58 is adapted for securing the first eye end 13 of the first leaf spring 12 to the first follower 46 and a second pin 60 is adapted for securing the third eye end 17 of the second leaf spring 14 to the second follower 48. More particularly, the first slipper block 50 includes a first pin receiver 62 and the second slipper block 52 includes a second pin receiver 64. See also FIGS. 3A and 3B. The first pin 58 is pushed through and received in the first pin receiver 62, the first eye end 13 of the first leaf spring 12, and the second pin receiver 64 so that the first eye end is captured on the pin 58 between the first and second slipper blocks in the channel 26 of the keeper 18. Note FIGS. 4 and 5 showing how the first and second slipper blocks 50, 52 are received by and engaged in the first and second elongated slots 38, 40 of the first guide track 34 in the sidewalls 22, 24. Each slipper block 50, 52 may be made from a strong low friction material of a type known in the art to allow free-sliding movement along the slots/guidetrack. Spacers/washers 72, provided between the sides of the eye end 13 and the inner surfaces of the sidewalls 22, 24 of the keeper 18 serve to maintain the opposed slipper blocks 50, 52 in proper, continuous engagement within the first guide track 34/opposed elongated slots 38, 40. In this regard, it should also be noted that the pin 58 includes a head end 74 and a threaded end 76 that cooperates with a lock nut 78 to secure the entire assembly together (i.e. slipper blocks 50, 52, first eye end 13, and spacer/washers 72).

The third slipper block 54 includes a third pin receiver 80 and the fourth slipper block 56 includes a fourth pin receiver 82. The second pin 60 is pushed through and received in the third pin receiver 80, the third eye end 17 of the second leaf spring 12, and the fourth pin receiver 82 so that the third eye end is captured on the pin 60 between the third and fourth slipper blocks in the channel 26 of the keeper 18. Note FIG. 4 showing how the third and fourth slipper blocks 54, 56 are received by and engaged in the third and fourth elongated slots 42, 44 of the second guide track 36 in the sidewalls 22, 24. The slipper blocks 54, 56 may be made from a strong low friction material of a type known in the art to allow free-sliding movement along the slots/guidetrack. Spacers/washers 72, provided between the sides of the eye end 17 and the inner surfaces of the sidewalls 22, 24 of the keeper 18 serve to maintain the opposed slipper blocks 54, 56 in proper, continuous engagement with the second guide track 36/opposed elongated slots 42, 44. In this regard, it should also be noted that the pin 60 includes a head end 74 and a threaded end 76 that cooperates with a lock nut 78 to secure the entire assembly together (i.e. slipper blocks 54, 56, third eye end 17, and spacer/washers 72).

In one possible embodiment, each slipper block 50, 52, 54, 56 is about 5 centimeters (cm) long, about 3.33 cm tall and about 0.65 cm thick and each elongated slot 38, 40, 42, 44 is about 10 cm long and about 3.96 cm tall. Thus each slipper block 50, 52, 54, 56 allows for approximately 5 cm of movement along the associated elongated slot 38, 40, 42, 44 in the longitudinal direction with clearance in the height direction to allow free sliding action without binding. In this way, stock doubled eye leaf springs 12, 13 are made to function as slipper springs without having to make any capital investment in actual slipper springs. This results in better road performance including better tire traction during hard or panic stops.

As the weight of the trailer is carried by the keeper 18 resting of the upper faces or edges of the slipper blocks 50, 52, 54, 56, some wear may eventually occur along those edges. In such a situation, the vertical orientation of the slipper blocks 50, 52, 54 and 56 may be reversed so the lower, pristine edge becomes the upper edge, supporting the weight. This substantially doubles the service life of the slipper blocks 50, 52, 54, 56.

The foregoing detailed description relates to the tandem axle suspension system 10 as found on one side of the trailer to which the suspension system is connected. As should be appreciated, an identical arrangement of components would be found on the other side.

Each of the following terms written in singular grammatical form: "a", "an", and "the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrase: "a slipper block", as used herein, may also refer to, and encompass, a plurality of slipper blocks.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

Terms of approximation, such as the terms about, substantially, approximately, etc., as used herein, refers to ±10% of the stated numerical value.

Although (a) the tandem axle suspension system, (b) the assembly for converting double eye leaf springs of a tandem axle suspension system to function as slipper springs and (c) the related method of converting a leaf spring to function as a slipper spring of this disclosure have been illustratively described and presented by way of specific exemplary embodiments, and examples thereof, it is evident that many alternatives, modifications, or/and variations, thereof, will be apparent to those skilled in the art. For example, the keeper 18 could be secured to the center hanger H and/or directly to the trailer frame F by welding or by other appropriate means if desired. Further, as illustrated in FIGS. 1A and 1, the keeper 18 may also be connected to two shock absorbers S of a shock absorber mounting assembly such as described in, for example, U.S. Pat. No. 9,333,827, the full disclosure of which is incorporated herein by reference. In this way the tandem axle suspension system 10 may be adapted to also provide suspension alignment capability. The shocks S also provide for control of spring rebound and compression energy. Accordingly, it is intended that all such alternatives, modifications, or/and variations, fall within the spirit of, and are encompassed by, the broad scope of the appended claims.

What is claimed:

1. A tandem axle suspension system, comprising:
    a first leaf spring having a first eye end and a second eye end;
    a second leaf spring having a third eye end and a fourth eye end;
    a keeper including a first guide track and a second guide track;
    a first follower adapted for receipt of the first eye end and sliding movement along the first guide track; and
    a second follower adapted for receipt of the third eye end and sliding movement along the second guide track.
2. The tandem axle suspension system of claim 1, wherein the keeper includes a center section, a first sidewall depending from the center section and a second sidewall depending from the center section wherein the center section and the first and second sidewalls define a channel.
3. The tandem axle suspension system of claim 2, wherein the first guide track includes a first elongated slot formed in the first sidewall and a second elongated slot formed in the second sidewall.
4. The tandem axle suspension system of claim 3, wherein the second guide track includes a third elongated slot formed in the first sidewall and a fourth elongated slot formed in the second sidewall.
5. The tandem axle suspension system of claim 4, wherein (a) the first elongated slot is transversely aligned with the second elongated slot, (b) the third elongated slot is transversely aligned with the fourth elongated slot, (c) the first elongated slot is longitudinally aligned with the third elongated slot and (d) the second elongated slot is longitudinally aligned with the fourth elongated slot.
6. The tandem axle suspension system of claim 5, further including a first pin adapted to secure the first eye end of the first leaf spring to the first follower and a second pin adapted to secure the third eye end of the second leaf spring to the second follower.
7. The tandem axle suspension system of claim 6, wherein the first follower includes a first slipper block received for sliding movement along the first elongated slot and a second slipper block received for sliding movement along the second elongated slot.
8. The tandem axle suspension system of claim 7, wherein (a) the first slipper block includes a first pin receiver, (b) the second slipper block includes a second pin receiver, (c) the first pin is received in and extends through the first and second pin receivers transversely across the channel and (d) the first eye end is captured on the first pin between the first and second slipper blocks.
9. The tandem axle suspension system of claim 8, wherein a third follower includes a third slipper block received for sliding movement along the third elongated slot and a fourth slipper block received for sliding movement along the fourth elongated slot.
10. The tandem axle suspension system of claim 9, wherein (a) the third slipper block includes a third pin receiver, (b) the fourth slipper block includes a fourth pin receiver, (c) the second pin is received in and extends through the third and fourth pin receivers transversely across the channel and (d) the third eye end is captured on the second pin between the third and fourth slipper blocks.
11. The tandem axle suspension system of claim 10, wherein the first pin and the second pin both include a head end and a threaded end adapted to receive a lock nut.
12. The tandem axle suspension system of claim 2, including a first twist plate and a second twist plate carried on and projecting from the first sidewall adjacent the center section.
13. The tandem axle suspension system of claim 2, further including a plurality of shock mount receivers provided in at least one of the first sidewall and the second sidewall.
14. An assembly for converting double eye leaf springs of a tandem axle suspension system into slipper springs, comprising:
    a keeper including a first guide track and a second guide track;
    a first follower adapted for receipt of a first eye end of a first leaf spring and sliding movement along the first guide track; and
    a second follower adapted for receipt of a first eye end of a second leaf spring and sliding movement along the second guide track.
15. The assembly of claim 14, wherein the keeper includes a center section, a first sidewall depending from the center section and a second sidewall depending from the center section wherein the center section and the first and second sidewalls define a channel.
16. The assembly of claim 15, wherein the first guide track includes a first elongated slot formed in the first sidewall and a second elongated slot formed in the second sidewall and the second guide track includes a third elongated slot formed in the first sidewall and a fourth elongated slot formed in the second sidewall.
17. The assembly of claim 16, wherein (a) the first elongated slot is transversely aligned with the second elongated slot, (b) the third elongated slot is transversely aligned with the fourth elongated slot, (c) the first elongated slot is longitudinally aligned with the third elongated slot and (d) the second elongated slot is longitudinally aligned with the fourth elongated slot.
18. The assembly of claim 17, further including a first pin adapted to secure the first end of the first leaf spring to the first follower and a second pin adapted to secure the third end of the second leaf spring to the second follower and wherein
    (1) the first follower includes a first slipper block received for sliding movement along the first elongated slot and a second slipper block received for sliding movement along the second elongated slot,
    (2) (a) the first slipper block includes a first pin receiver, (b) the second slipper block includes a second pin receiver, (c) the first pin is received in and extends through the first and second pin receivers transversely across the channel and (d) the first eye end of the first leaf spring is captured on the first pin between the first and second slipper blocks, (3) a third follower includes a third slipper block received for sliding movement along the third elongated slot and a fourth slipper block received for sliding movement along the fourth elongated slot, and (4) (a) the third slipper block includes a third pin receiver, (b) the fourth slipper block includes a fourth pin receiver, (c) the second pin is received in and extends through the third and fourth pin receivers transversely across the channel and (d) the first eye end of the second leaf spring is captured on the second pin between the third and fourth slipper blocks.

\* \* \* \* \*